United States Patent [19]

Bourdin

[11] 4,270,600
[45] Jun. 2, 1981

[54] ACCUMULATOR OF ENERGY FOR CONVERSION TO HEAT

[75] Inventor: Francis Bourdin, Tournan-En-Brie, France

[73] Assignee: Saint-Gobain Industries, Neuilly-sur-Seine, France

[21] Appl. No.: 49,204

[22] Filed: Jun. 15, 1979

[30] Foreign Application Priority Data

Jun. 16, 1978 [FR] France .................. 78 18121

[51] Int. Cl.³ ........................................ F28D 21/00
[52] U.S. Cl. ............................ 165/104.31; 126/430; 126/435; 126/436; 165/45; 165/104.19; 252/70
[58] Field of Search ............. 165/104 S, 45; 126/436, 126/435, 400, 430; 252/70

[56] References Cited

U.S. PATENT DOCUMENTS

| 3,527,921 | 9/1970 | Voglesonger | 165/45 X |
| 4,010,731 | 3/1977 | Harrison | 126/400 X |
| 4,142,576 | 3/1979 | Perry et al. | 165/104 S X |

FOREIGN PATENT DOCUMENTS 2605953  8/1977  Fed. Rep. of Germany ............ 165/45
2621300 11/1978  Fed. Rep. of Germany .
2325882  4/1977  France .

Primary Examiner—Albert W. Davis
Attorney, Agent, or Firm—Pennie & Edmonds

[57] ABSTRACT

A system including a source of energy (for example, the solar pickup 14) and a closed circuit for a heat-carrying fluid including a storage (1, 10). The circuit provides a primary circuit (7, 13), the storage having a chamber sealed by a plurality of walls (4, 12) and a filling agent (6, 11) exhibiting a calorific capacity and thermal conductivity for heat transfer from the primary circuit to a second circuit (8) in heat exchange relation with the filling agent. The filling agent comprises a gel comprising an acrylic acid derivative.

3 Claims, 2 Drawing Figures

ACCUMULATOR OF ENERGY FOR CONVERSION TO HEAT

DESCRIPTION

1. Technical Field

The present invention relates to a storage for storing calorific energy from a source and capable of heat conduction and transfer between a pair of circuits. One circuit provides a closed path for a heat-carrying fluid, while the other circuit carries a fluid to be heated.

2. Background Art

Because of the increasing costs of energy from conventional or traditional energy sources, attention has been directed to other possible sources of energy. Also, attention has been directed to increasing the yield and/or efficiency of energy-consuming apparatus which may be the heating installation of a dwelling or the supply of heated water for home or possible other use.

One particular source of energy—the sun—has aroused a degree of enthusiasm within technical circles, and it is known that buildings may be heated by the energy "absorbed" in a solar collector or pickup adapted to be disposed, for example, on the roof of the building. The solar pickup may comprise a body whose front face is usually protected by a plate of transparent plastic or glass and whose back face is in contact with a heat-carrying fluid. The heat-carrying fluid may be air or water, for example, which circulates between the solar pickup and a thermal insulating element in a heat-carrying circuit including a storage apparatus. Typically, the solar pickup may comprise a screen wall placed between support posts which may be an integral part of the building.

The storage apparatus may be connected directly onto the circuit or be put in heat exchange relation with the heat-carrying fluid, and the circuit thus comprises a heat exchanger within the storage, as well as to comprise or constitute a primary circuit for exchange of heat to a secondary circuit through a double heat exchanger within said storage.

German Printed Publication No. 2,621,300 is typical of the prior art including, generally, a solar pickup, at least a first tank of water and a circuit for communicating a heat-carrying fluid to the tank for heat exchange between the circuit and water. A problem or disadvantage resulted from this form of apparatus, namely, the system had only slight calorific capacity which might not be satisfactory for providing heat within a period wherein there is a lack of sun.

To overcome this problem or disadvantage, said publication proposes to increase the calorific capacity of the system aforementioned by the provision of a substantially increased capacity (for the period of a week) storage together with a smaller capacity storage for meeting daily needs. But this proposal has not met with either success or acceptance because of the costs involved.

It has also been proposed to provide a storage of larger capacity in an in-ground location and to fill the storage with a heat accumulator substance, such as earth, sand or pebbles. It is found, however, that this form of heat accumulator substance has poor calorific capacity and poor thermal conductivity. Examples of this form of prior art is disclosed in French Pat. No. 2,325,882, as well as No. 2,353,021.

DISCLOSURE OF INVENTION

The present invention seeks to overcome the problems and disadvantages of the prior art in that it is directed to a storage having greater calorific energy capacity and thermal energy conductivity to provide heat exchange within the storage between a primary circuit conducting a heat-carrying fluid and a secondary circuit conducting a fluid to be heated.

The storage of the present invention is adapted to be supplied heat energy from any source, such as, for example, a solar pickup and includes an insulated enclosure which is located below ground. The energy source is located in a primary circuit which extends through the storage. A secondary circuit also extends through the storage and both circuits are in heat transfer relation within the storage with a filling agent comprised of a gel, preferably formed from an acrylic acid derivative. The filling agent of the present invention provides a surprising calorific capacity and thermal conductivity, quite comparable to that of water, yet it is not subject to the disadvantages of water, as will be brought out.

In a preferred aspect of the invention, the filling agent consists solely of a gel having about 85 to about 90% by weight water and about 15 to about 10% by weight of acrylic acid derivative base polymers. In another preferred aspect of the invention, the filling agent may comprise the gel and particulate including both coarse and fine particles in total amount to assure (over and above the volume of space taken by the primary and secondary circuits) that about 35% of the total space remains for gel which is polymerized in the interstices between particles.

The storage, further, may comprise one of a series of two or more storages, the second of which is an auxiliary storage to supply daily consumption requirements. The primary storage is as described and the storages are included in a system to a heat source, the system having capability of control of the heat-carrying fluid to the storage and/or auxiliary storage.

The storage of the present invention and the overall system is particularly adapted for buildings, as well as individual dwellings.

Other advantages of the present invention will become clear upon a reading of the mode of operation to follow.

BEST MODE FOR CARRYING OUT THE INVENTION

The present invention is in a storage device, tank or reservoir (hereinafter "storage") for storing calorific energy. While the source of the calorific energy may derive from a single one or a series of solar panels, such as those previously described, the invention also contemplates the use of the storage with other sources of calorific energy.

The storage to be described preferably is located in the vicinity of or closely adjacent to a wall of the basement 2 of a dwelling 3, and, as illustrated in the Figures, below ground level. As illustrated, further, the storage is covered with a layer 5 of fill thereby to be hidden from sight. The fill may be a humus material.

Figure 1:
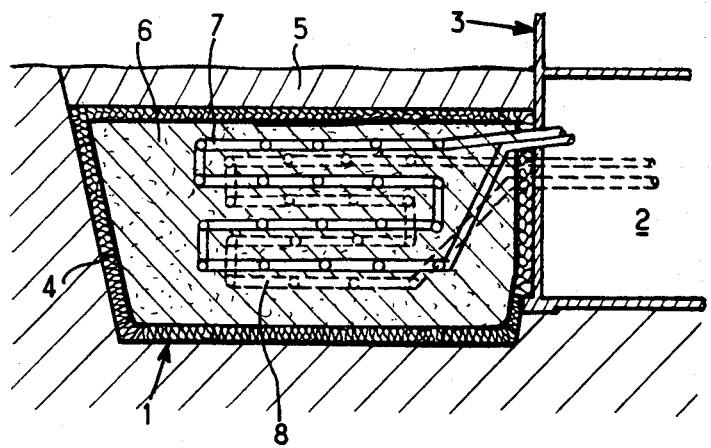
FIG. 1 is a schematic view in vertical section through a storage according to one form of the invention.

The storage, as may be seen in FIG. 1, is in the form of an enclosure 1 having walls 4 including top, side and bottom walls. These walls describe a closed chamber of any particular cross-section, such as rectangular. Preferably, the chamber is insulated. Thus, the walls either are formed of a thermal insulating material or else the walls throughout their outer surface are covered with a thermal insulating material. Any particular wall material, whether or not capable of exhibiting insulative capability, must, of course, be capable of withstanding a prescribed measure of hydrostatic pressure as may be exerted on the walls because of either the filling agent within the chamber or the location of the enclosure relative to the ground, but this measure may be rather small, as explained hereafter, and materials capable of use are well known.

The closed chamber is hermetically sealed, even in its upper region, by means of a steam-tight material, which, for example, may be a sheet (not shown) of a fluid impermeable plastic, preferably sheathed throughout the inner surfaces of the walls.

A filling agent 6 exhibiting calorific capacity and thermal conductivity is carried within the closed chamber of enclosure 1. The filling agent comprises a gel, having an acrylic acid derivative base. As will be described, the filling agent is in thermal contact with both a primary conduit circuit 7 and a secondary conduit 8.

The gel includes from about 85 to about 90% by weight water and about 15 to about 10% by weight of acrylic acid derivative base polymers. According to the invention, an aqueous solution of acrylic acid derivative, for example, methylolacrylamide and acrylamide, in equal parts, are mixed and then polymerized in water either with a peroxide or persalt. An accelerator which may be, for example, diethylaminopropionitrile (DEAPN) and possibly a cross-linking agent, such as N—N' methylenebisacrylamide (NN'—MBA) is then added to the mixture.

A suitable resin for making such a gel may be the resin sold under the tradename and registered mark ROCAGIL 1295.

Additional materials for enhancement of various characteristics of the gel may be added to the mixture within the scope of the invention.

The filling agent 6 within the closed chamber may consist solely of the above-described gel, and the polymerization of the aqueous resin solution may be carried out within about 30 minutes' time. More particularly, the polymerization process may be carried out either at the factory or at the site of use of the storage. To avoid the creation of an inordinate amount of pressure within the enclosure throughout the polymerization process, it is possible and preferable that the gel be polymerized within the chamber in successive gel layers, so that the wall need not be very resistant.

The filling agent may comprise, additionally, in thorough mixture with the gel, a mixture of both sand and pebbles. The pebbles may be of a coarse particle size of about 80 to about 130 mm in diameter and the sand may be finely divided, having a size of about 0.5 mm. Discounting the volume of the chamber taken by the primary and secondary conductive conduits 7 and 8, respectively, a quantity of pebbles to fill approximately 50% of the volume of the chamber may be used. The open volume remaining may be reduced by approximately 30% through addition of sand, thereby to provide about 35% of the initial available volume of the chamber for polymerization of the gel. The gel is polymerized about the solid particles (both sand and pebbles) thereby to fill the interstices and provide good conductivity of heat which otherwise, because of the poor heat conductive capability of the solid particles, would not be possible.

The primary conductive conduit 7 (hereinafter "primary circuit") and the secondary conductive conduit 8 (hereinafter "secondary circuit") both are disposed within the chamber of enclosure 1 and supported by the filling agent 6. Each circuit includes an inlet to a major heat transfer length within the chamber and an outlet from that length. As illustrated in FIG. 1, the inlets and outlets extend through a wall 4 (the side wall) of enclosure 1 and the wall of dwelling 3 into the region of the basement 2. In order to maintain the hermetic seal, a sealing structure (not shown) is provided about each of the inlet and outlet conduits.

The gel of the filling agent, described above, has a thermal conductivity and calorific capacity comparable to that of water, yet it is not subject to the same, possibly troublesome convection movements and hydrostatic pressure conditions.

The storage of the present invention operates in a manner likened to a heat exchanger. Thus, the primary circuit, which is closed to confine a conventional heat-carrying fluid, yields calories to the filling agent and the secondary circuit, providing a path for fluid to be heated, takes in calories from the filling agent. The heat transfer is achieved in a storage of relatively small volume because of good calorific energy storage capacity. Also, the heat transfer is achieved in a storage not subject to the same level of hydrostatic pressure as would be exhibited by water. Thus, the filling agent of the present invention overcomes or substantially eliminates the drawbacks of loss of filling agent by leakage, even if the walls of the enclosure becomes fissured, because it avoids the development of noticeable hydrostatic pressure.

In the form of the invention of FIG. 1, the primary and secondary circuits 7 and 8, respectively, are not illustrated in any manner of connection to a source of calorific energy. Any energy source may be employed.

Figure 2:
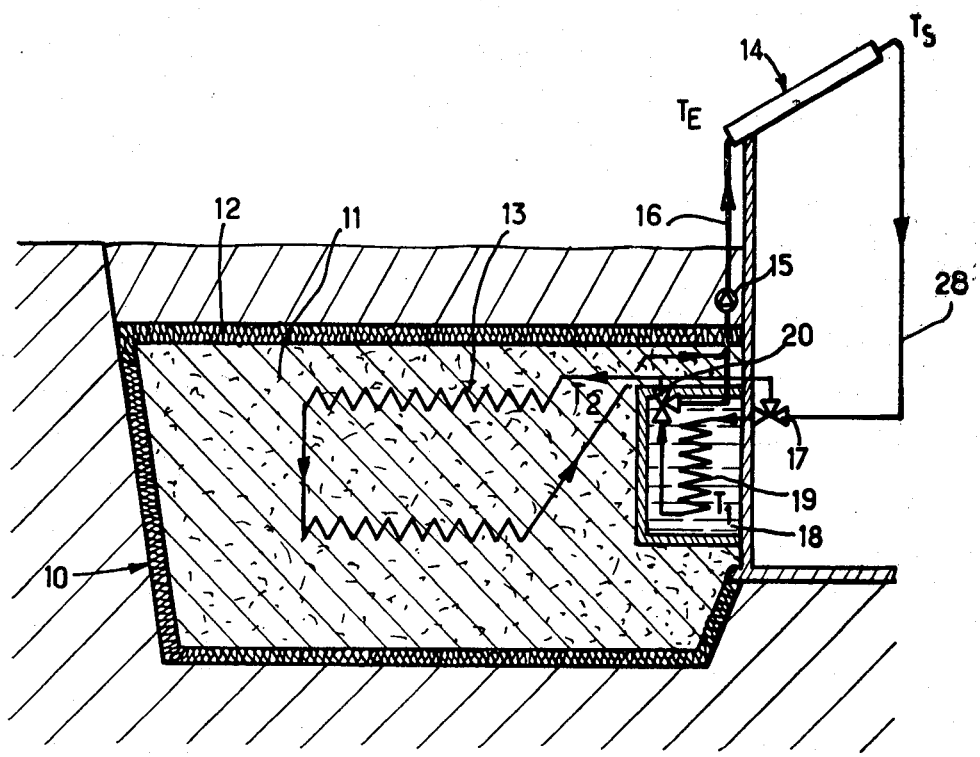
FIG. 2 is a similar view of another form of storage including a two-zone chamber.

In the form of the invention in FIG. 2, the primary circuit 13 of the storage of enclosure 10 is coupled with a standard hot water storage 18, both of which may be connected in series, or individually, to an energy source characterized as a "solar pickup" 14. This provides a two-zone storage including that of enclosure 10 and of the hot water or auxiliary storage 18. According to the invention, the enclosure 10 may have a capacity, for example, of 150 m$^3$ and the storage 18 may have a capacity, for example, of 3 m$^3$.

The enclosure 10 is of the same overall construction of wall (the walls 12) to provide thermal insulative capability; it is located below ground, in the vicinity of or adjacent to the basement of a dwelling; it is hermetically sealed; and, it includes a filling agent (the filling agent 11) as described in connection with the discussion of FIG. 1.

The solar pickup 14 is connected in the primary circuit 13, and the circuit 19 of the hot water storage 18, by a pair of valves 17 and 20 having three-way control capability. A pump 15 maintains a flow of heat-carrying fluid through the closed system. To this end, a conduit 16 provides a return conduit to the solar pickup and a conduit 28 connects the solar pickup to the valve 17.

While not shown in the Figure, a secondary circuit which takes in calories from the filling agent, as yielded by the primary circuit 13, likewise is included in the storage.

Various temperature conditions may exist within the overall system. And, pump 15 will be operative to circulate the heat-carrying fluid as long as certain temperature relationships exist. Thus, pump 15 circulates the heat-carrying fluid if either $T_S > T_1$ or $T_2 > T_E$, wherein: $T_S$ is the output temperature at the solar pickup; $T_1$ is the temperature of the water in the hot water storage; $T_2$ is the temperature of the filling agent; and, $T_E$ is the input temperature at the solar pickup.

If both of the temperature relationships exist, then the flow of heat-carrying fluid will be in the series connection from the solar pickup 14, to each of the auxiliary storage 18 and storage 10, and in return to the solar pickup.

If, on the other hand, only one of the temperature relationships exist, then the flow will by-pass either the storage 10 or the auxiliary storage 18. Particularly, if the temperature of the filling agent is greater than the temperature at the input of the solar pickup, then the flow of heat-carrying fluid will circulate through the auxiliary storage. If the temperature at the output of the solar pickup is greater than the temperature of water in the hot water storage, then the flow of heat-carrying fluid will circulate through the storage 10. The valves 17 and 20 are controlled automatically to provide this circulation capability, as well known.

By virtue of the series connection capability of storage 10 and auxiliary storage 18, assuming the aforementioned temperature relationships exist, it is possible that the auxiliary storage act as a temporary storage for hotter water (for household use) while the storage 10, having greater size to store calories throughout a longer period, provides a means of transfer of calories to the auxiliary storage, and vice versa.

The storage of FIG. 2, likewise, may be supplied by a source of energy other than the solar pickup within the context of the present invention.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

I claim:

1. A storage for storing calorific energy, as may derive from a solar pickup including an insulating casing, a filling agent comprising at least partially a gel of an acrylic acid derivative base, heat-carrying fluid circuit means extending within said casing in thermal contact with said filling agent, said heat-carrying fluid circuit means comprising a primary circuit and a secondary circuit of conduits, one of which is for a heat-carrying fluid and the other of which is for a fluid to be heated, an auxiliary water storage, said heat-carrying fluid circuit means also in contact with water in said water storage, and valve means for circulating said heat-carrying fluid in said storage and/or auxiliary storage as a function of the respective temperatures of said heat-carrying fluid and said storages.

2. A storage for storing calorific energy, as may derive from a solar pickup including an insulating casing, a filling agent comprising at least partially a gel containing from about 85 to 90% by weight of water and about 15 to about 10% by weight or acrylic acid derivative base polymers, at least a heat-carrying fluid circuit in thermal contact with said filling agent, an auxiliary water storage, said heat-carrying fluid circuit also in contact with water in said water storage, and valve means for circulating said heat-carrying fluid in said storage and/or auxiliary storage as a function of the respective temperatures of said heat-carrying fluid and said storages.

3. The storage according to one of claims 1 or 2 wherein said filling agent further comprises particulate, including pebbles and sand, and wherein said gel is mixed thoroughly within the interstices of said particulate.

* * * * *